(12) United States Patent
Hiwatashi et al.

(10) Patent No.: US 10,669,953 B2
(45) Date of Patent: Jun. 2, 2020

(54) ENGINE CONTROL SYSTEM

(71) Applicant: MAZDA MOTOR CORPORATION, Hiroshima (JP)

(72) Inventors: Keiichi Hiwatashi, Hiroshima (JP); Hiroyuki Morioka, Hiroshima (JP); Yuto Sakasegawa, Hiroshima (JP); Kenichi Ogasawara, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/343,244

(22) PCT Filed: Oct. 18, 2017

(86) PCT No.: PCT/JP2017/037676
§ 371 (c)(1),
(2) Date: Apr. 18, 2019

(87) PCT Pub. No.: WO2018/079371
PCT Pub. Date: May 3, 2018

(65) Prior Publication Data
US 2019/0249609 A1 Aug. 15, 2019

(30) Foreign Application Priority Data
Oct. 26, 2016 (JP) ................. 2016-209365

(51) Int. Cl.
*F02D 17/02* (2006.01)
*F02D 28/00* (2006.01)
(Continued)

(52) U.S. Cl.
CPC ............. *F02D 17/02* (2013.01); *F02D 13/04* (2013.01); *F02D 28/00* (2013.01);
(Continued)

(58) Field of Classification Search
CPC ...... F02D 17/02; F02D 45/00; F02D 41/0087; F02D 41/123; F02D 13/04; F02D 28/00;
(Continued)

(56) References Cited

U.S. PATENT DOCUMENTS

| 2004/0163866 A1* | 8/2004 | Sen ........................ B60K 31/04 180/179 |
| 2004/0237935 A1* | 12/2004 | Fukusako ............... F02D 13/06 123/406.47 |
| 2012/0116647 A1 | 5/2012 | Pochner et al. | |

FOREIGN PATENT DOCUMENTS

JP 2004-353478 A 12/2004

OTHER PUBLICATIONS

International Search Report issued in PCT/JP2017/037676; dated Nov. 14, 2017.
(Continued)

*Primary Examiner* — Xiao En Mo
(74) *Attorney, Agent, or Firm* — Studebaker & Brackett PC

(57) ABSTRACT

An engine control system comprises: an engine 10 capable of switching between a reduced-cylinder operation mode in which combustion is stopped in a part of a plurality of cylinders 2 and an all-cylinder operation mode in which combustion is performed in all the plurality of cylinders 2; and a PCM 50 configured to stop fuel supply to the cylinders 2 when a given fuel cut-off condition is satisfied. The PCM 50 is operable, during a transition from a state in which the engine 10 is operated in the reduced-cylinder operation mode to a state in which the fuel cut-off condition is satisfied, to stop the fuel supply to the cylinders 2 at a timing earlier than that during a transition from a state in which the engine 10 is operated in the all-cylinder operation mode to the state in which the fuel cut-off condition is satisfied.

15 Claims, 9 Drawing Sheets

(51) Int. Cl.
*F02P 5/15* (2006.01)
*F02D 13/04* (2006.01)
*F02D 41/12* (2006.01)
*F02D 41/00* (2006.01)
*F02D 45/00* (2006.01)

(52) U.S. Cl.
CPC ....... *F02D 41/0087* (2013.01); *F02D 41/123* (2013.01); *F02D 45/00* (2013.01); *F02P 5/1504* (2013.01); *F02D 2041/0012* (2013.01); *F02D 2250/18* (2013.01); *Y02T 10/18* (2013.01)

(58) Field of Classification Search
CPC .......... F02D 2250/18; F02D 2041/0012; F02P 5/1504; Y02T 10/18
See application file for complete search history.

(56) References Cited

OTHER PUBLICATIONS

The extended European search report issued by the European Patent Office dated Sep. 4, 2019, which corresponds to EP17864871.3-1007 and is related to U.S. Appl. No. 16/343,244.
Written Opinion issued in PCT/JP2017/037676; dated Nov. 14, 2017.

\* cited by examiner

ENGINE CONTROL SYSTEM

TECHNICAL FIELD

The present invention relates to an engine control system, and more particularly to an engine control system for an engine capable of being operated while switching between a reduced-cylinder operation mode and an all-cylinder operation mode.

BACKGROUND ART

Heretofore, there has been proposed a technique of operating an engine while switching between a reduced-cylinder operation mode in which combustion is stopped in a part of a plurality of cylinders (a part of a plurality of cylinders are deactivated) and an all-cylinder operation mode in which combustion is performed in all the plurality of cylinders, depending on an operating condition of the engine (see, for example, the following Patent Document 1). Particularly, in the Patent Document 1, there is disclosed a technique of delaying the execution of fuel cut-off by a given time period after satisfaction of a given fuel cut-off condition (deceleration operation condition), and gradually retarding ignition timing until this time period elapses, wherein a retard amount of ignition timing is set differently between the reduced-cylinder operation mode and the all-cylinder operation mode.

Specifically, in the technique described in the Patent Document 1, from a viewpoint of suppressing a shock caused by a rapid change in engine torque due to the fuel cut-off, the fuel cut-off is executed after reducing the engine torque by gradually retarding ignition timing. However, when the engine is operated in the reduced-cylinder operation mode, there is a possibility that ignition timing is not adequately retarded and thereby the engine torque is not sufficiently reduced, resulting in the occurrence of a shock at start of the fuel cut-off. Therefore, in the technique described in the Patent Document 1, with a view to solving this problem, during the reduced-cylinder operation mode, the retard amount of ignition timing is increased, as compared to during the all-cylinder operation mode.

CITATION LIST

Patent Document

Patent Document 1: JP 2004-353478A

SUMMARY OF INVENTION

Technical Problem

Meanwhile, when the engine being operated in the reduced-cylinder operation mode or in the all-cylinder operation mode is transitioned to a state in which the fuel cut-off is performed, there is a tendency that a difference in feeling (particularly, deceleration feeling) given to a driver during the fuel cut-off occurs between the two modes. This is for the following two reasons.

(1) Reason 1

As described in the Patent Document 1, conventionally, instead of executing the fuel cut-off immediately after satisfaction of the fuel cut-off condition, the fuel cut-off is executed after reducing the engine torque by gradually retarding ignition timing after satisfaction of the fuel cut-off condition, thereby suppressing a rapid change in the engine torque due to the fuel cut-off. However, if the operation of retarding ignition timing prior to the fuel cut-off is performed during the reduced-cylinder operation mode, in the same manner as that during the all-cylinder operation mode, a retard speed of ignition timing becomes slower, because, during the reduced-cylinder operation mode, an ignition interval is greater than that during the all-cylinder operation mode. This results in delay of a timing at which the engine torque is reduced to a desired level. For the above reason, in terms of deceleration feeling given to a driver during the fuel cut-off, a difference (feeling of strangeness) occurs between the reduced-cylinder operation mode and the all-cylinder operation mode.

(2) Reason 2

Generally, during the reduced-cylinder operation mode, an intake valve and/or an exhaust valve in each of the deactivated cylinders are maintained in a valve-closed state (typically, both of the intake and exhaust valves are maintained in a fully closed state), so that these deactivated cylinders become failing to contribute to an increase in negative pressure inside an intake passage. Thus, during the reduced-cylinder operation mode, a pumping loss generated in the engine becomes smaller, and an engine brake force becomes smaller, as compared to during the all-cylinder operation mode. Specifically, the magnitude of the pumping loss depends on how high the negative pressure inside the intake passage at a position downstream of a throttle valve is. During the reduced-cylinder operation mode, intake air is sucked by only a part of the cylinders (only activated cylinders other than the deactivated cylinders), so that the negative pressure at the position downstream of the throttle valve is less likely to be increased, and thereby an increase rate of the negative pressure inside the intake passage becomes smaller (a timing at which the negative pressure is increased to a desired level). For the above reason, the magnitude of the engine brake force generated during the fuel cut-off becomes different between the reduced-cylinder operation mode and the all-cylinder operation mode, so that, in terms of the deceleration feeling given to a driver, a difference (feeling of strangeness) occurs between the two modes.

Here, in the technique described in the Patent Document 1, with a view to obtaining the same deceleration feeling during the fuel cut-off, irrespective of whether the engine is operated in the reduced-cylinder operation mode or in the all-cylinder operation mode, the retard amount of ignition timing is increased during the reduced-cylinder operation mode. Specifically, between the reduced-cylinder operation mode and the all-cylinder operation mode, a time period for retarding ignition timing before actually performing the fuel cut-off is evenly set, and the retard amount of ignition timing is changed. However, even if the retard amount of ignition timing is changed between the reduced-cylinder operation mode and the all-cylinder operation mode, a difference in engine brake force due to a difference in negative pressure inside the intake passage between the reduced-cylinder operation mode and the all-cylinder operation mode, as mentioned in the Reason 2, cannot be suppressed. That is, the technique described in the Patent Document 1 is incapable of adequately suppressing the feeling of strangeness due to the difference in engine brake force.

The present invention has been made to solve the above conventional problem, and an object thereof to provide an engine control system capable of adequately suppressing a difference in deceleration feeling during the fuel cut-off, between the reduced-cylinder operation mode and the all-cylinder operation mode.

Solution to Technical Problem

In order to achieve the above object, the present invention provides an engine control system comprising: an engine having a plurality of cylinders and capable of being operated while switching between a reduced-cylinder operation mode in which combustion is stopped in a part of the plurality of cylinders and an all-cylinder operation mode in which combustion is performed in all the plurality of cylinders; and a controller configured to stop fuel supply to the cylinders, when a given fuel cut-off condition has been satisfied, wherein the controller is operable, during a transition from a state in which the engine is operated in the reduced-cylinder operation mode to a state in which the fuel cut-off condition is satisfied, to stop the fuel supply to the cylinders at a timing earlier than that during a transition from a state in which the engine is operated in the all-cylinder operation mode to the state in which the fuel cut-off condition is satisfied.

In the engine control system of the present invention having the above feature, during transition from the state in which the engine is operated in the reduced-cylinder operation mode (from the state of operation in the reduced-cylinder operation mode) to the state in which the fuel cut-off condition is satisfied (to the state of operation under satisfaction of the fuel cut-off condition), the fuel supply to the cylinders is stopped at a timing earlier than (at a timing advanced with respect to) that during transition from the state in which the engine is operated in the all-cylinder operation mode (from the state of operation in the all-cylinder operation mode) to the state of operation under satisfaction of the fuel cut-off condition. Thus, an intake valve and an exhaust valve in each of the deactivated cylinders during the reduced-cylinder operation mode can be activated in a relatively early stage, for example, so as to early increase a negative pressure inside an intake passage of the engine. In this case, it is possible to reduce a difference in engine brake force generated in the engine during the fuel cut-off, between the reduced-cylinder operation mode and the all-cylinder operation mode. Therefore, the present invention makes it possible to adequately suppress a difference in deceleration feeling given to a driver during the fuel cut-off, between the reduced-cylinder operation mode and the all-cylinder operation mode.

Preferably, in the engine control system of the present invention, the controller is further configured to perform a control of reducing a torque of the engine when the fuel cut-off condition has been satisfied, and to determine whether or not a reduction amount of the torque caused by the control of reducing the torque has reached a given value, the controller is operable, when the reduction amount of the torque is determined to reach the given value, to stop the fuel supply to the cylinders, and the controller is operable, during the transition from the state in which the engine is operated in the reduced-cylinder operation mode to the state in which the fuel cut-off condition is satisfied, to perform at least one of a control of increasing the reduction amount of the torque and a control of increasing a reduction rate of the torque, as compared to during the transition from the state in which the engine is operated in the all-cylinder operation mode to the state in which the fuel cut-off condition is satisfied.

According to this feature, when the fuel cut-off condition has been satisfied, the torque of the engine is reduced, and then when the reduction amount of the torque has reached the given value, the fuel cut-off is started, wherein during the reduced-cylinder operation mode, the control of increasing the reduction amount of the torque and/or the control of increasing the reduction rate of the torque, as compared to during the all-cylinder operation mode, are performed. This makes it possible to adequately advance a start timing of the fuel cut-out during the reduced-cylinder operation mode, as compared to during the all-cylinder operation mode. Further, according to the above feature, during a period after satisfaction of the fuel cut-off through until the start of the fuel cut-off, the engine torque is reduced, so that it is possible to adequately suppress a rapid change in the engine torque due to the fuel cut-off.

Preferably, in the engine control system of the present invention, the controller is operable, when a given time period has elapsed after a satisfaction of the fuel cut-off condition, to stop the fuel supply to the cylinders, and the controller is operable, during the transition from the state in which the engine is operated in the reduced-cylinder operation mode to the state in which the fuel cut-off condition is satisfied, to shorten the given time period, as compared to during the transition from the state in which the engine is operated in the all-cylinder operation mode to the state in which the fuel cut-off condition is satisfied.

According to this feature, during the reduced-cylinder operation mode, the given time period after satisfaction of the fuel cut-off through until the start of the fuel cut-off is shortened, as compared to during the all-cylinder operation mode, so that it is possible to adequately advance the start timing of the fuel cut-off during the reduced-cylinder operation mode.

Preferably, the engine control system of the present invention further comprises a valve stopping mechanism provided in the engine and capable of switching between a valve-closed state maintaining mode in which at least one of a group of intake valves and a group of exhaust valves of the engine is partially maintained in a valve-closed state and an opening-closing mode in which the valve-closed state maintaining mode is released to set all the intake and exhaust valves to an openable-closable state, the controller is further configured to set the valve stopping mechanism to the valve-closed state maintaining mode, in the reduced-cylinder operation mode, and the controller is operable, when the stop of the fuel supply has been completed, to switch the valve stopping mechanism which is set in the valve-closed state maintaining mode, to the opening-closing mode.

According to this feature, during the reduced-cylinder operation mode, when the stop of the fuel supply has been completed, the valve stopping mechanism is switched from the valve-closed state maintaining mode to the opening-closing mode so as to allow the intake valve and the exhaust valve in each of the deactivated cylinders during the reduced-cylinder operation mode to be operated in an openable and closable manner. This makes it possible to adequately and early increase the negative pressure inside the intake passage during the reduced-cylinder operation mode.

Preferably, in the engine control system of the present invention, the controller is operable to stop the fuel supply to the cylinders, when a time period according to a negative pressure inside an intake passage of the engine has elapsed after a satisfaction of the fuel cut-off condition.

According to this feature, the time period after satisfaction of the fuel cut-off through until the start of the fuel cut-off may be more shortened as the negative pressure inside the intake passage becomes smaller. This makes it possible to adequately advance the start timing of the fuel cut-off during the reduced-cylinder operation mode, as compared to during the all-cylinder operation mode.

Preferably, in the engine control system of the present invention, the controller is operable to stop the fuel supply to the cylinders, when a given time period according to an engine speed of the engine has elapsed after a satisfaction of the fuel cut-off condition.

According to this feature, the time period after satisfaction of the fuel cut-off through until the start of the fuel cut-off may be more shortened as the engine speed becomes lower. This makes it possible to adequately advance the start timing of the fuel cut-off during the reduced-cylinder operation mode, as compared to during the all-cylinder operation mode.

Effect of Invention

The engine control system of the present invention is capable of adequately suppressing a difference in deceleration feeling given to a driver during the fuel cut-off, between the reduced-cylinder operation mode and the all-cylinder operation mode.

DESCRIPTION OF EMBODIMENTS

With reference to the accompanying drawings, an engine control system according to the present invention will now be described.

<System Configuration>

Figure 1:
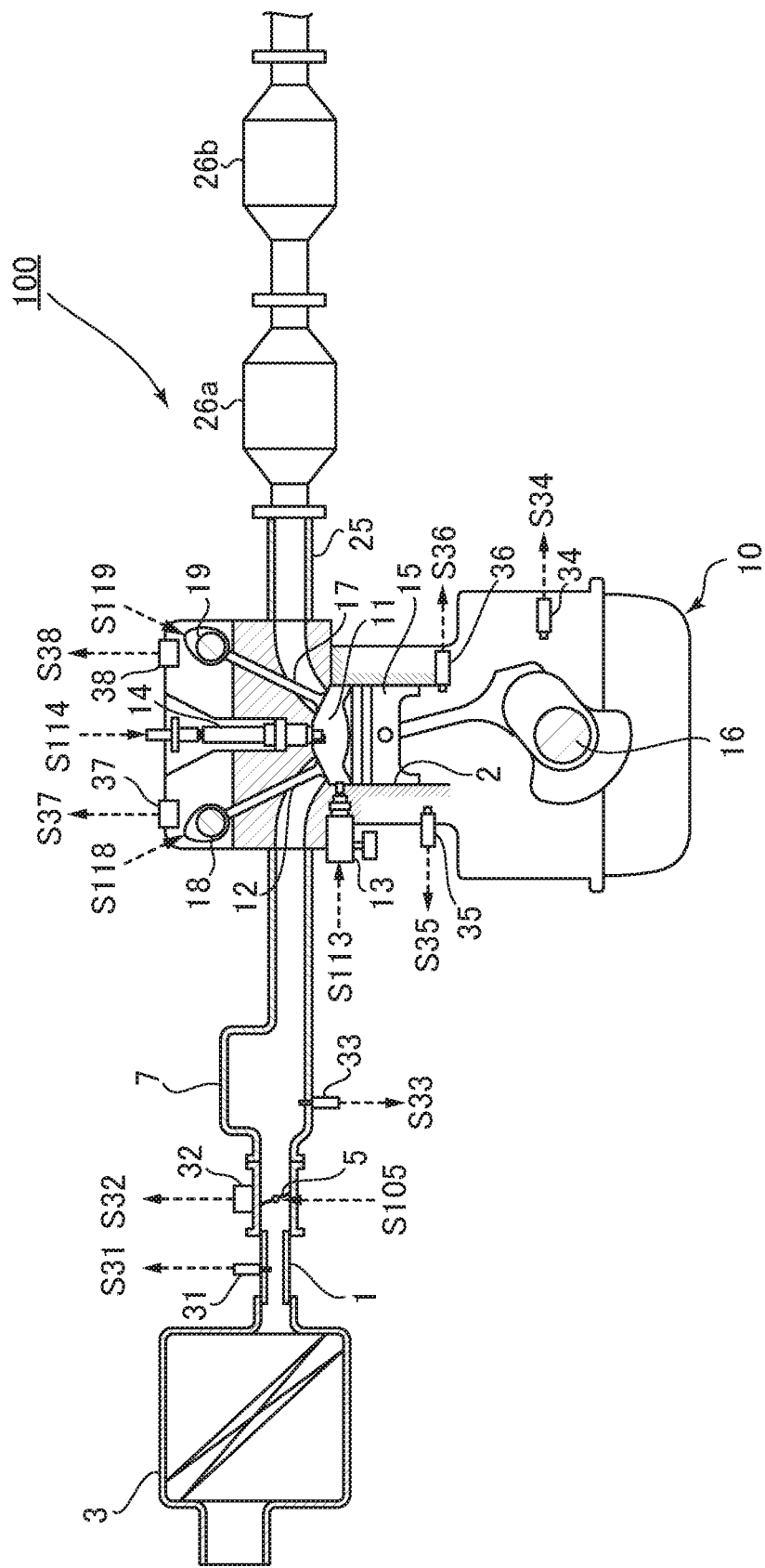
FIG. 1 is a schematic diagram depicting the configuration of an engine system employing an engine control system according to an embodiment in the present invention.
Figure 2:
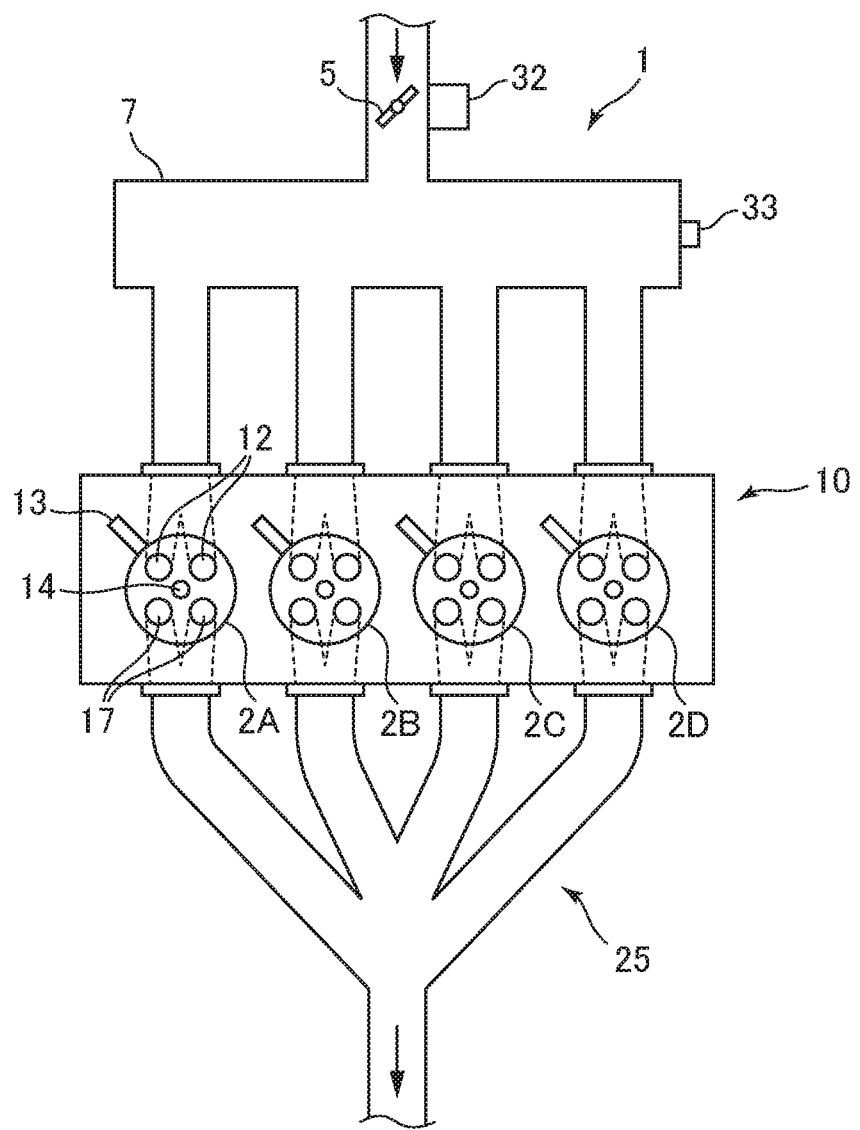
FIG. 2 is a schematic top plan view depicting an engine according to the present embodiment.
Figure 3:
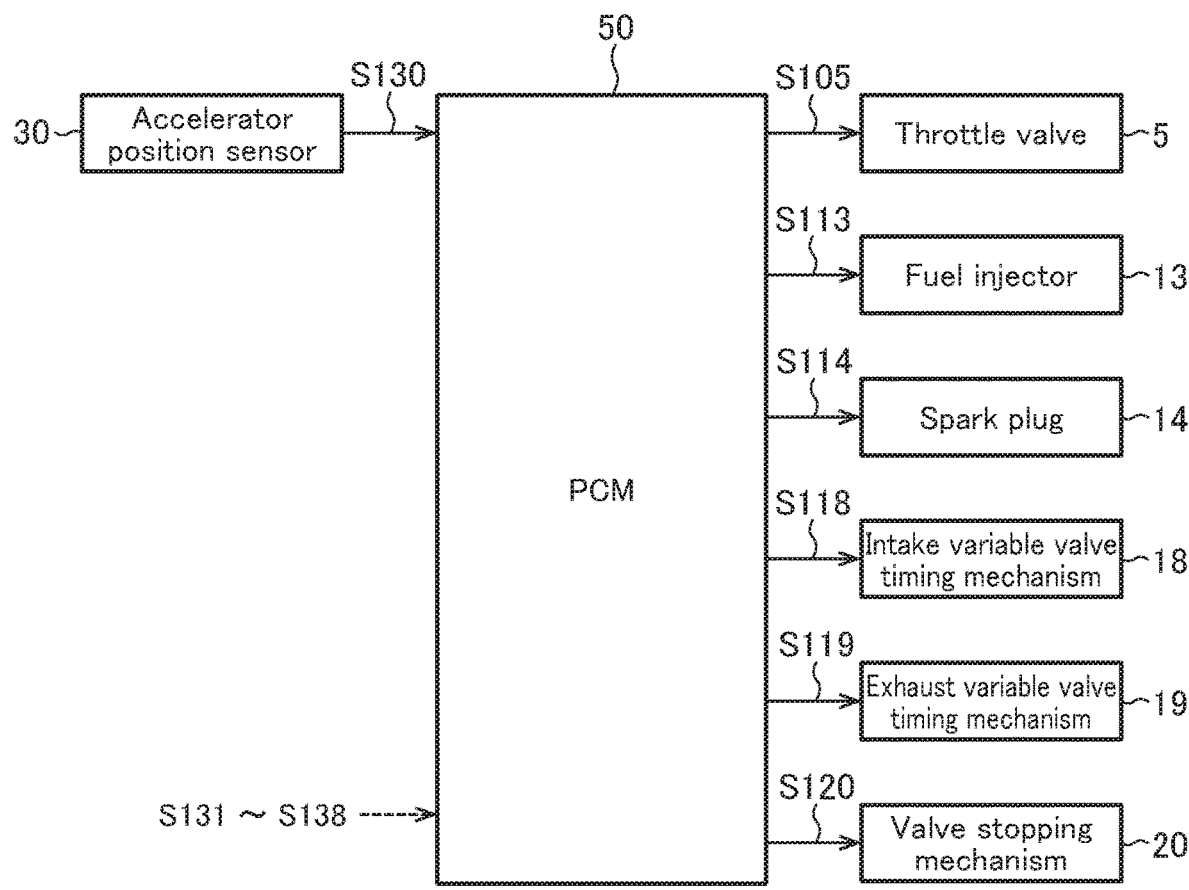
FIG. 3 is a block diagram depicting an electrical configuration of the engine control system according to the present embodiment.

First of all, with reference to FIGS. 1 to 3, an engine system employing an engine control system according to the present invention will be described. FIG. 1 is a schematic diagram depicting the configuration of an engine system employing an engine control system according to an embodiment in the present invention. FIG. 2 is a schematic top plan view depicting an engine according to the present embodiment. FIG. 3 is a block diagram depicting an electrical configuration of the engine control system according to the present embodiment.

As depicted in FIGS. 1 to 3, the engine system 100 primarily comprises: an intake passage 1 for allowing intake air (air) introduced from the outside to pass therethrough; an engine 10 (specifically, gasoline engine) for generating a vehicle driving force through combustion of a mixture of intake air supplied from the intake passage 1 and fuel supplied from the after-mentioned fuel injector 13; an exhaust passage 25 for discharging exhaust gas produced by the combustion within the engine 10; a plurality of sensors 30 to 38 for detecting various states regarding the engine system 100; and a PCM (Power-train Control Module) 50 for controlling the entire engine system 100.

The intake passage 1 is provided with: an air cleaner 3 for cleaning intake air introduced from the outside; a throttle valve 5 for adjusting the amount of intake air passing therethrough (intake air amount); and a surge tank 7 for temporarily storing intake air to be supplied to the engine 10, which are arranged in this order from the side of an upstream end of the intake passage 1.

As depicted in FIG. 2, in this engine system 100, the engine 10 is an in-line four-cylinder engine having four cylinders 2 (2A to 2D) linearly arranged side-by-side. This engine 10 is primarily provided with: an intake valve 12 for selectively introducing intake air from the intake passage 1 into a combustion chamber 11; a fuel injector 13 for injecting fuel toward the combustion chamber 11; a spark plug 14 for igniting a mixture of the intake air and the fuel supplied into the combustion chamber 11; a piston 15 configured to be reciprocatingly moved according to combustion of the air-fuel mixture within the combustion chamber 11; a crankshaft 16 configured to be rotated according to the reciprocating movement of the piston 15; and an exhaust valve 17 for selectively discharging, to the exhaust passage 25, exhaust gas produced by the combustion of the air-fuel mixture within the combustion chamber 11.

The piston 15 is provided in each of the cylinders 2A to 2D, wherein the four pistons 15 are configured such that they are reciprocatingly moved with a phase difference of 180 degrees crank angle (180° CA). Correspondingly, ignition timing in the cylinders 2A to 2D is set such that it is sequentially shifted in phase by 180° CA.

In this engine system 100, the engine 10 is a cylinder deactivatable engine capable of being operated in a mode in which two of the four cylinders 2A to 2D are deactivated and the remaining two cylinders are activated, i.e., in a reduced-cylinder operation mode.

Specifically, assuming that the cylinder 2A, the cylinder 2B, the cylinder 2C and the cylinder 2D arranged in this order rightwardly in FIG. 2 are defined, respectively, as a first cylinder, a second cylinder, a third cylinder and a fourth cylinder, ignition (firing) is performed in the following order: the first cylinder 2A→the third cylinder 2C→the fourth cylinder 2D→the second cylinder 2B, during an all-cylinder operation mode in which all the four cylinders 2A to 2D are activated.

On the other hand, during the reduced-cylinder operation mode, an ignition operation of the spark plug 14 provided in each of the four cylinders and fuel injection from the fuel injector 13 provided in each of the four cylinders are prohibited in two of the cylinders which are mutually non-consecutive in terms of a firing order (combustion order) (in this engine system 100, the first cylinder 2A and the fourth cylinder 2D), and are alternately performed in the remaining two cylinders (i.e., the third cylinder 2C and the second cylinder 2B).

Further, the engine 10 is configured such that operation timings (which are equivalent to valve phases) of the intake valve 12 and the exhaust valve 17 provided in each of the four cylinders are variably controlled, respectively, by an intake variable valve timing mechanism 18 and an exhaust variable valve timing mechanism 19 which serve as a variable valve timing mechanism. As each of the intake variable valve timing mechanism 18 and the exhaust variable valve timing mechanism 19, it is possible to employ any of various heretofore-known types. For example, a variable valve timing mechanism of an electromagnetic type or a hydraulic type may be employed to variably control the operation timings of the intake valve 12 and the exhaust valve 17.

The engine 10 is further provided with a valve stopping mechanism 20 for stopping opening and closing operations of the intake valves 12 and the exhaust valves 17 in the first and fourth cylinders 2A, 2D, during the reduced-cylinder operation mode. This valve stopping mechanism 20 is configured to be capable of switching between a valve-closed state maintaining mode in which the intake valves 12 and the exhaust valves 17 in the first cylinder 2A and the fourth cylinder 2D are maintained in a valve-closed state and an opening-closing mode in which the valve-closed state maintaining mode is released to set all the intake and exhaust valves 12, 17 in the first and fourth cylinders 2A, 2D to an openable-closable state (the state of the intake and exhaust valves 12, 17 in the first and fourth cylinders 2A, 2D during the valve-closed state maintaining mode will hereinafter be referred to as "valve-stop state", and the state of the intake and exhaust valves 12, 17 in the first and fourth cylinders 2A, 2D during the opening-closing mode will hereinafter be referred to as "valve-drive state".

For example, the valve stopping mechanism 20 is constructed such that it comprises a so-called lost motion mechanism interposed between a cam and a valve and operable to selectively enable and disable a driving force of the cam to be transmitted to the valve. Alternatively, the valve stopping mechanism 20 may be constructed such that it comprises a so-called cam shifting mechanism operable to selectively transmit one of operation states of two first and second cams having different cam profiles, wherein the first cam has a cam profile capable of enabling opening and closing operations of a valve, and the second cam has a cam profile capable of disabling (stopping) the opening and closing operations of the valve.

The exhaust passage 25 is primarily provided with a plurality of exhaust gas purifying catalysts 26a, 26b having exhaust gas purifying functions, such as a NOx catalyst, a three-way catalyst and an oxidation catalyst. In the following description, when the exhaust gas purifying catalysts 26a, 26b are generically used without being functionally distinguished from each other, they will be occasionally described as "exhaust gas purifying catalyst 26".

As mentioned above, the engine system 100 is provided with the plurality of sensors 30 to 38 for detecting various states regarding the engine system 100. Specifically, these sensors 30 to 38 are as follows. The sensor 30 is an accelerator position sensor operable to detect an accelerator position, i.e., a relative position of an accelerator pedal (which is equivalent to an amount of depression of the accelerator pedal manipulated by a driver). The sensor 31 is an airflow sensor operable to detect an intake air amount which is equivalent to a flow rate of intake air passing through the intake passage 1. The sensor 32 is a throttle opening sensor operable to detect a throttle opening which is an opening degree of the throttle valve 5. The sensor 33 is an intake pressure sensor operable to detect the pressure of intake air to be supplied to the engine 10 (intake pressure). The sensor 34 is a crank angle sensor operable to detect a crank angle of the crankshaft 16. The sensor 35 is a water temperature sensor operable to detect a water temperature which is a temperature of cooling water for cooling the engine 10. The sensor 36 is an in-cylinder temperature sensor operable to detect an in-cylinder temperature which is an internal temperature of each of the cylinders 2 of the engine 10. The sensors 37 and 38 are, respectively, an intake-side cam angle sensor operable to detect operation timings of the intake valve 12 including a valve-closing timing, and an exhaust-side cam angle sensor operable to detect operation timings of the exhaust valve 17 including a valve-closing timing. The above sensors 30 to 38 are operable to output, to the PCM 50, detection signals S130 to S138 corresponding to detected parameters, respectively.

The PCM 50 is operable, based on the detection signals S130 to S138 input from the above sensors 30 to 38, to perform controls for various components in the engine system 100. Specifically, as depicted in FIG. 3, the PCM 50 is operable to: supply a control signal S105 to the throttle valve 5 to control opening and closing timings and the throttle opening of the throttle valve 5; supply a control signal S113 to each of the fuel injectors 13 to control a fuel injection amount and a fuel injection timing; supply a control signal S114 to each of the spark plugs 14 to control ignition timing; supply control signals S118, S119, respectively, to the intake variable valve timing mechanism 18 and the exhaust variable valve timing mechanism 19 to control the operation timings of the intake valve 12 and the exhaust valve 17; and supply a control signal S120 to the valve stopping mechanism 20 to control disabling/enabling of the opening and closing operations of the intake and exhaust valves 12, 17 in the first and fourth cylinders 2A, 2D.

Particularly, in this engine system 100, the PCM 50 is operable to control the fuel injectors 13 such that fuel supply to the cylinders 2 of the engine 2 is stopped when a given fuel cut-off condition (hereinafter appropriately expressed as "F/C condition"), typically a condition that the accelerator position is approximately 0%, is satisfied. Simultaneously, the PCM 50 is operable to stop ignition by the spark plugs 14.

Figure 4:
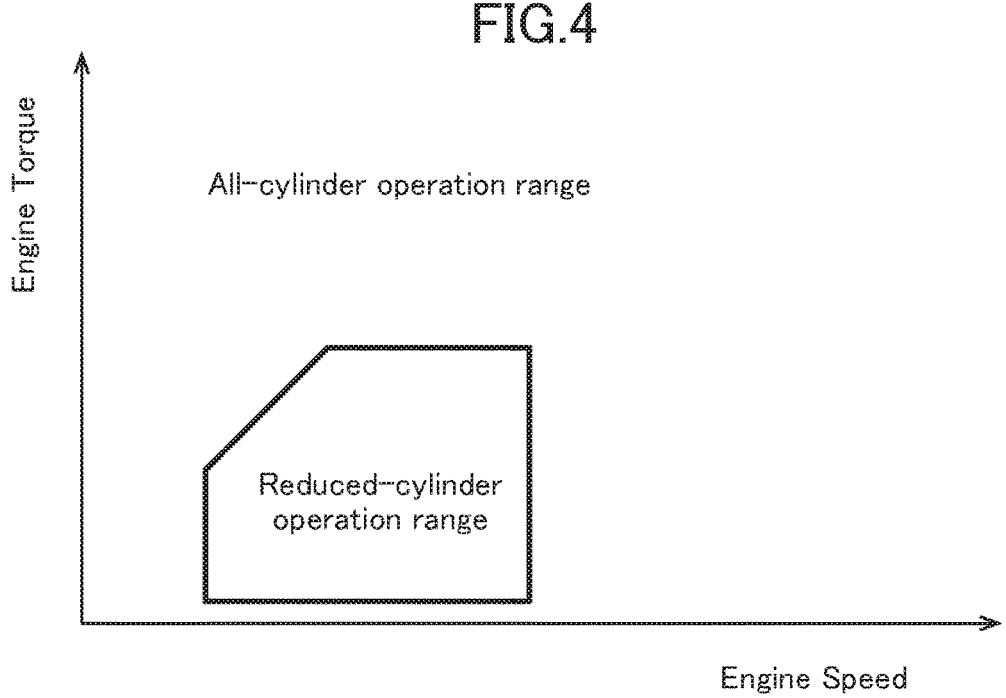
FIG. 4 is a map conceptually presenting engine operation ranges in which the engine according to the present embodiment is operated, respectively, in two switchable operation modes.

In this engine system 100, the PCM 50 is operable to perform control of switching an operation mode of the engine 10 between the reduced-cylinder operation mode and the all-cylinder operation mode, based on an operating condition of the engine 10. Here, with reference to FIG. 4, engine operation ranges in which the engine 10 in this engine system 100 is operated, respectively, in the reduced-cylinder operation mode and in the all-cylinder operation mode will be described. FIG. 4 is a map conceptually presenting engine operation ranges in which the engine 10 in the engine system 100 is operated, respectively, in the two switchable operation modes. In FIG. 4, the horizontal axis represents an engine speed, and the vertical axis represents an engine torque.

In the map presented in FIG. 4, the reduced-cylinder operation range in which the engine 10 is operated in the reduced-cylinder operation mode is set in a region where the engine speed is relatively low (e.g., about 1500 to 3500 rpm), and the engine torque is relatively low, and the all-cylinder operation range in which the engine 10 is operated in the all-cylinder operation mode is set in the remaining region other than the reduced-cylinder operation range. Particularly, in this map, a region where the engine torque is around 0 (which is equivalent to a region where engine load is approximately 0, in other words, the accelerator position is approximately 0%) is set to fall within the all-cylinder operation range, instead of the reduced-cylinder operation mode. That is, the reduced-cylinder operation mode is not extended to the region where engine load is approximately 0. Therefore, when the accelerator position is shifted toward 0% during the reduced-cylinder operation mode (in this case, the F/C is performed), the operation mode is switched from the reduced-cylinder operation mode to the all-cylinder operation mode, without being maintained in the reduced-cylinder operation mode.

The PCM 50 is operable to refer to this map to determine whether current values of the engine speed and the engine torque fall within the reduced-cylinder operation range or the all-cylinder operation range, and, according to a result of the determination, instruct the valve stopping mechanism 20 to control disabling/enabling of the opening and closing operations of the intake and exhaust valves 12, 17 in the first and fourth cylinders 2A, 2D so as to execute one of the reduced-cylinder operation mode and the all-cylinder operation mode. Simultaneously, the PCM 50 is operable to control execution/non-execution of ignition by the spark plugs 14 and fuel injection by the fuel injectors 13, with respect to the first and fourth cylinders 2A, 2D.

In this engine system 100, the PCM 50 is composed of a computer which comprises: a CPU (Central Processing Unit); various programs (including a basic control program such as an OS, and an application program capable of being activated on the OS to realize a specific function) to be interpreted and executed by the CPU; and an internal memory such as ROM or RAM storing therein the programs and a variety of data. Further, the PCM 50 is configured to function as "controller", as set forth in the appended claims.
<Details of Control in Each Embodiment>

Next, details of specific control to be executed by the PCM 50 in an engine control system according to each of a plurality of specific embodiments of the present invention will be described.

First of all, the outline of control in the engine control system according to each of the specific embodiments will be described. In the specific embodiments, the PCM 50 is operable to change a start timing of F/C between the reduced-cylinder operation mode and the all-cylinder operation mode. Specifically, the PCM 50 is operable to control a timing at which the F/C is started after satisfaction of the F/C condition, such that the timing is advanced during the reduced-cylinder operation mode, as compared to during the all-cylinder operation mode. More specifically, the PCM 50 is operable, when the engine 10 is transitioned from the state of operation in the reduced-cylinder operation mode to the state of operation under satisfaction of the F/C condition, to start the F/C at an earlier timing than that when the engine 10 is transitioned from the state of operation in the all-cylinder operation mode to the state of operation under satisfaction of the F/C condition.

Basically, when the engine 10 is transitioned from the state of operation in the reduced-cylinder operation mode to the state of operation under satisfaction of the F/C condition, the PCM 50 is operable to switch from the reduced-cylinder operation mode to the all-cylinder operation mode, at a time when the F/C with respect to all the activated cylinders 2 has been completed. In this case, the PCM 50 is operable to control the valve stopping mechanism 20 such that the intake and exhaust valves 17 in the deactivated cylinders 2 during the reduced-cylinder operation mode are switched from the valve-stop state (valve-closed state maintaining mode) to the valve-drive state (opening-closing mode). Thus, by advancing the start timing of the F/C during the reduced-cylinder operation mode, a timing of switching from the reduced-cylinder operation mode to the all-cylinder operation mode is advanced, i.e., the intake and exhaust valves 17 in the deactivated cylinders 2 during the reduced-cylinder operation mode are openably and closably operated in a relatively early stage. As a result, even when the engine 10 is transitioned from the state of operation in the reduced-cylinder operation mode to the state of operation under satisfaction of the F/C condition, the negative pressure inside the intake passage 1 is early increased, so that it becomes possible to ensure an engine brake force approximately equal to that when the engine 10 is transitioned from the state of operation in the all-cylinder operation mode to the state of operation under satisfaction of the F/C condition. This makes it possible to adequately suppress a difference in deceleration feeling given to a driver during the F/C, between the reduced-cylinder operation mode and the all-cylinder operation mode.

Next, details of control in the engine control system according to each of the specific embodiments (first to third embodiments) will be described below.

First Embodiment

Firstly, the control in the engine control system according to the first embodiment will be described. In the first embodiment, the PCM 50 is operable to start the F/C when a given time period has elapsed after satisfaction of the F/C condition, wherein the PCM 50 is operable, during transition from the state of operation in the reduced-cylinder operation mode to the state of operation under satisfaction of the F/C condition, to shorten the given time period, as compared to during transition from the state of operation in the all-cylinder operation mode to the state of operation under satisfaction of the F/C condition. In this way, the timing at which the F/C is started after satisfaction of the F/C condition is advanced during the reduced-cylinder operation mode, as compared to the all-cylinder operation mode.

Figure 5:
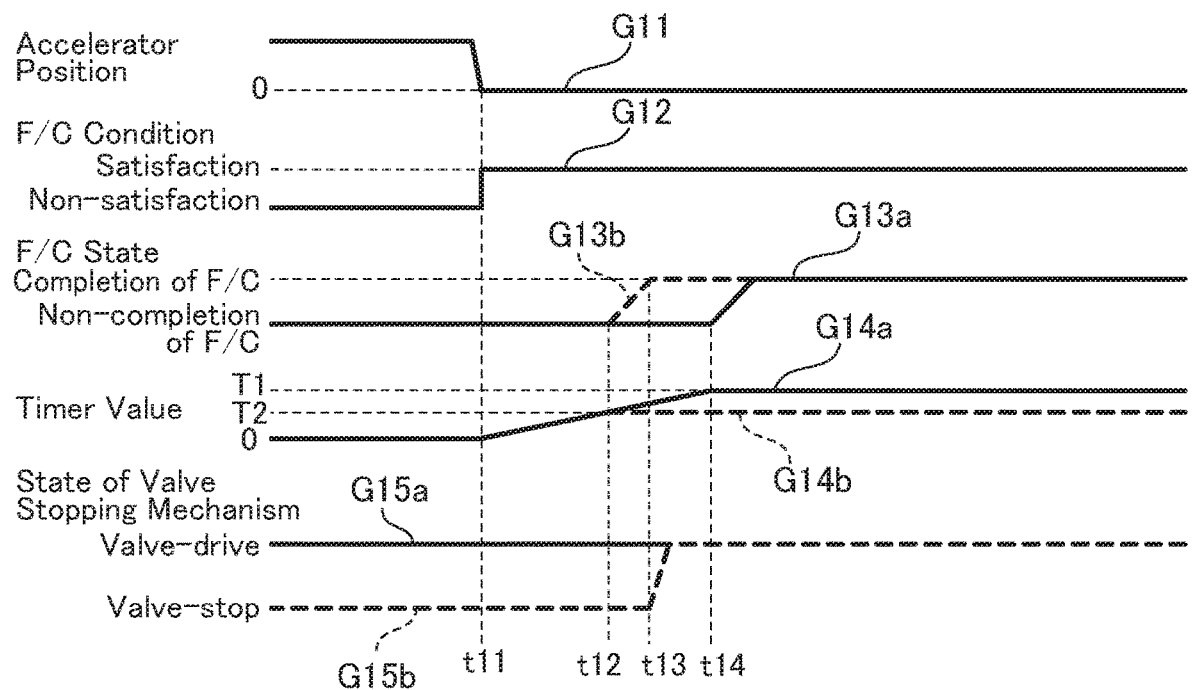
FIG. 5 is a time chart presenting operation of an engine control system employing F/C control, according to a first embodiment of the present invention.

FIG. 5 is a time chart presenting one example of operation of the engine control system employing F/C control, according to the first embodiment. In FIG. 5, the accelerator position, the F/C condition (satisfaction or non-satisfaction), a F/C state (completion or non-completion), a timer value, and the state of the valve stopping mechanism 20 (valve-stop state or valve-drive state), are presented in this order in a downward direction. Further, in FIG. 5, the graphs G13a, G14a, G15a each indicated by the solid line represent changes of various states during the all-cylinder operation mode, and the graphs G13b, G14b, G15b each indicated by the broken line represent changes of the various states during the reduced-cylinder operation mode.

As depicted in FIG. 5, at time t1, the accelerator position becomes 0% (see the graph G11), and the F/C condition is satisfied (see the graph G12). At this point, the PCM 50 operates to start counting of a timer so as to obtain an elapsed time after satisfaction of the F/C condition (see the graphs G14a, G14b). Then, in the case where the engine 10 is operated in the all-cylinder operation mode, when the counted timer value has reached a first given time period T1, the PCM 50 operates to start the F/C at time t14 (see the graph G13a).

On the other hand, in the case where the engine 10 is operated in the reduced-cylinder operation mode, when the counted timer value has reached a second given time period T2 shorter than the first given time period T1, the PCM 50 operates to start the F/C at tine t12 (at an earlier timing than the time t14 as the F/C start timing during the all-cylinder operation mode) (see the graph G13b). Subsequently, when the F/C with respect to all the cylinders (activated cylinders) 2 has been completed, the PCM 50 operates to start at time t13 to control the valve stopping mechanism 20 such that the intake and exhaust valves 12, 17 in the deactivated cylinders 2 are switched from the valve-stop state to the valve-drive state (see the graph G15b). As a result, the engine 10 is substantially switched from the reduced-cylinder operation mode and the all-cylinder operation mode.

Figure 6:
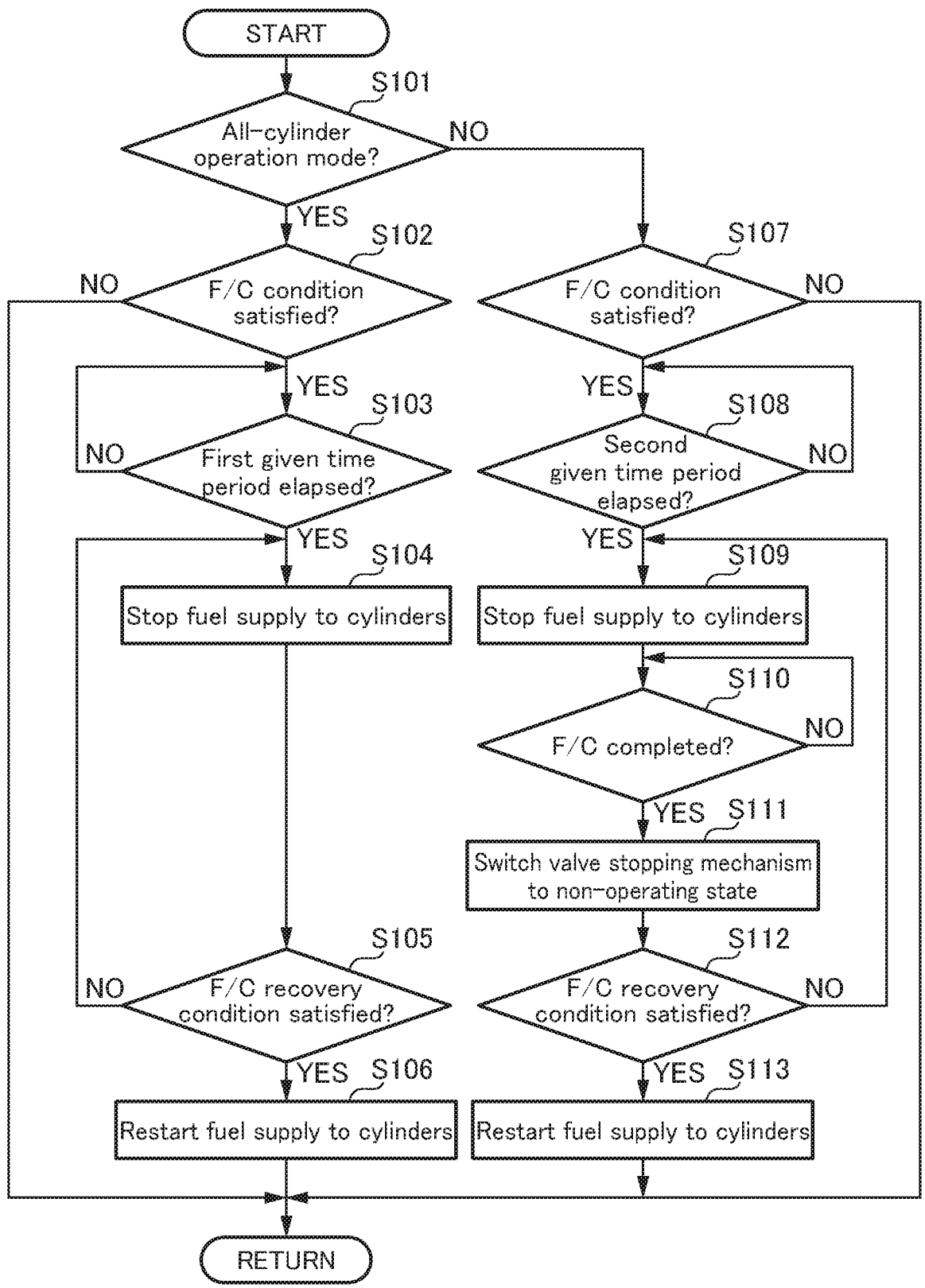
FIG. 6 is a flowchart presenting a F/C control processing routine to be executed by the engine control system according to the first embodiment.

FIG. 6 is a flowchart presenting a F/C control processing routine to be executed by the engine control system according to the first embodiment. This flow is repeatedly executed by the PCM 50 in a given cycle period.

At step S101, the PCM 50 operates to determine whether or not the engine 10 is currently operated in the all-cylinder operation mode. In one example, the PCM 50 operates to perform the determination in the step S101, based on whether the mode in which the valve stopping mechanism 20 is currently operated is the valve-closed state maintaining mode or the opening-closing mode. As a result, when the engine 10 is determined to be operated in the all-cylinder operation mode (step S101: YES), the processing routine proceeds to step S102. In this case, the valve stopping mechanism 20 is set in the opening-closing mode. That is, the valve stopping mechanism 20 is in a non-operating state (in order words, all the intake and exhaust valves, 12, 17 of the engine 10 are in the valve-drive state).

On the other hand, when the engine 10 is determined not to be operated in the all-cylinder operation mode (step S101: NO), i.e., when the engine is currently operated in the reduced-cylinder operation mode, the processing routine proceeds to step S107. In this case, the valve stopping mechanism 20 is set in the valve-closed state maintaining mode. That is, the valve stopping mechanism 20 is in an operating state (in order words, the intake and exhaust valves 12, 17 in the second and fourth cylinders 2A, 2D are in the valve-stop state).

In FIG. 6, processings in steps S102 to S106 are processings to be executed during the all-cylinder operation mode, and processings in steps S107 to S113 are processings to be executed during the reduced-cylinder operation mode.

Firstly, the processings in the steps S102 to S106 to be executed during the all-cylinder operation mode will be described. In the step S102, the PCM 50 operates to determine whether or not the F/C condition has been satisfied. Typically, the PCM 50 operates to perform the determination in the step S102, using, as the F/C condition, a condition that a value of the accelerator position detected by the accelerator position sensor 30 is approximately 0%. As a result, when the F/C condition is determined not to have been satisfied (step S102: NO), the processing routine is terminated. On the other hand, when the F/C condition is determined to have been satisfied (step S102: YES), the PCM 50 operates to start counting of the timer so as to obtain the elapsed time after satisfaction of the F/C condition, and the processing routine proceeds to the step S103.

In the step S103, the PCM 50 operates to determine whether or not the first given time period T1 has elapsed after satisfaction of the F/C condition, based on a counted timer value. As a result, when the first given time period T1 is determined not to have elapsed (step S103: NO), the processing routine returns to the step S103. In this case, the PCM 50 operates to continue counting of the timer, and repeatedly perform the determination in the step S103 until the first given time period T1 elapses. On the other hand, when the first given time period T1 is determined to have elapsed (step S103: YES), the processing routine proceeds to the step S104.

In the step S104, the PCM 50 operates to control the fuel injectors 13 such that the fuel supply to all the cylinders 2 of the engine 10 is stopped sequentially one-by-one, i.e., to execute the F/C. Simultaneously, the PCM 50 operates to stop ignition by the spark plugs 14 in all the cylinders 2.

Subsequently, in the step S105, the PCM 50 operates to determine whether or not a condition for recovery from the F/C (F/C recovery condition) has been satisfied. Typically, the determination in the step S105 is performed, using, as the F/C recovery condition, a condition that the accelerator position is increased from 0% (this condition is equivalent to a condition that the accelerator pedal is depressed), or a condition that the engine speed becomes a given value or less (at which misfire occurs). As a result, when the F/C recovery condition is determined not to have been satisfied (step S105: NO), the processing routine returns to the step S104. In this case, the PCM 50 operates to continue the F/C. On the other hand, when the F/C recovery condition is determined to have been satisfied (step S105: YES), the processing routine proceeds to the step S106.

In the step S106, the PCM 50 operates to sequentially restart the fuel supply to the cylinders 2 of the engine 10 so as to terminate the F/C. Simultaneously, the PCM 50 operates to restart ignition by the spark plugs 14 in the cylinders 2. In this way, combustion is recovered in each of the cylinders 2 of the engine 10.

Secondly, the processings to be executed in the steps S107 to S113 during the reduced-cylinder operation mode will be described. In the following description, with regard to the same processing as that during the all-cylinder operation mode, its description will be appropriately omitted.

In the step S107, the PCM 50 operates to determine whether or not the F/C condition has been satisfied. As a result, when the F/C condition is determined not to have been satisfied (step S107: NO), the processing routine is terminated. On the other hand, when the F/C condition is determined to have been satisfied (step S107: YES), the PCM 50 operates to start counting of the timer so as to obtain the elapsed time after satisfaction of the F/C condition, and the processing routine proceeds to the step S108.

In the step S108, the PCM 50 operates to determine whether or not the second given time period T2 (<the first given time period T1) has elapsed after satisfaction of the F/C condition, based on a counted timer value. As a result, when the second given time period T2 is determined not to have elapsed (step S108: NO), the processing routine returns to the step S108. In this case, the PCM 50 operates to continue counting of the timer, and repeatedly perform the determination in the step S108 until the second given time period T2 elapses. On the other hand, when the second given time period T2 is determined to have elapsed (step S108: YES), the processing routine proceeds to the step S109.

In the step S109, the PCM 50 operates to control the fuel injectors 13 such that the fuel supply to all the cylinders 2 of the engine 10 is stopped sequentially one-by-one, i.e., to execute the F/C. Simultaneously, the PCM 50 operates to stop ignition by the spark plugs 14 in the activated cylinders 2.

Subsequently, in the step S110, the PCM 50 operates to determine whether or not the F/C (stop of the fuel supply) with respect to all the activated cylinders 2 has been completed. As a result, when the F/C is determined not to have been completed (step S110: NO), the processing routine returns to the step S110. In this case, the PCM 50 operates to repeatedly perform the determination in the step S110 until the F/C has been completed. On the other hand, when the F/C is determined to have been completed (step S110: YES), the processing routine proceeds to the step S111.

In the step S111, the PCM 50 operates to switch the valve stopping mechanism 20 from the operating state to the non-operating state. That is, the PCM 50 operates to control the valve stopping mechanism 20 such that the intake and exhaust valves 12, 17 in the deactivated cylinders 2 are switched from the valve-stop state (valve-closed state maintaining mode) to the valve-drive state (opening-closing mode). As a result, the engine 10 is substantially switched from the reduced-cylinder operation mode and the all-cylinder operation mode.

Subsequently, in the step S112, the PCM 50 operates to determine whether or not the F/C recovery condition has been satisfied. As a result, when the F/C recovery condition is determined not to have been satisfied (step S112: NO), the processing routine returns to the step S109. In this case, the PCM 50 operates to continue the F/C. Here, in the case where the processing routine returns to the step S109, it is only necessary to maintain the valve stopping mechanism 20 in the non-operating state, because the processing in the step S111 has already be completed, i.e., the valve stopping mechanism 20 has already been switched from the operating state to the non-operating state (That is, in this case, substantially only the processing in the step S109 will be repeatedly performed).

On the other hand, when the F/C recovery condition is determined to have been satisfied (step S112: YES), the processing routine proceeds to the step S113. In the step S113, the PCM 50 operates to sequentially restart the fuel supply to the cylinders 2 of the engine 10 so as to terminate the F/C.

In the engine control system according to the first embodiment, during the reduced-cylinder operation mode, the given time period after satisfaction of the F/C condition through until the start of the F/C is shortened, as compared to that during the all-cylinder operation mode, so that it is possible to advance the F/C start timing during the reduced-cylinder operation mode, as compared to during the all-cylinder operation mode. This makes it possible to allow the intake and exhaust valves 12, 17 in the deactivated cylinders 2 during the reduced-cylinder operation mode to early start opening-closing operation, thereby early increasing the negative pressure inside the intake passage 1. Therefore, it becomes possible to effectively reduce a difference in engine brake force produced during the F/C, between the reduced-cylinder operation mode and the all-cylinder operation mode. Thus, in the engine control system according to the first embodiment, it becomes possible to adequately suppress a difference in deceleration feeling given to a driver during the F/C, between the reduced-cylinder operation mode and the all-cylinder operation mode.

Second Embodiment

Secondly, the control in the engine control system according to the second embodiment will be described. In the second embodiment, the PCM 50 is operable to start the F/C when a given time period has elapsed after satisfaction of the F/C condition, wherein the given time is shortened during the reduced-cylinder operation mode, as compared to during the all-cylinder operation mode, as with the first embodiment. However, in the second embodiment, the PCM 50 is operable, until the given time period elapses after satisfaction of the F/C condition, to gradually retard ignition timing of the spark plugs 14 (hereinafter expressed to appropriately as "ignition retard control") to thereby reduce engine torque. In this way, a rapid change in engine torque due to the F/C is suppressed.

In the following description, different control and processing from those in the first embodiment will be primarily described, and the same control and processing as those in the first embodiment will be appropriately omitted. That is, any control and processing which are not described below should be considered to be the same as those in the first embodiment. The same is applied to description about advantageous effects.

Figure 7:
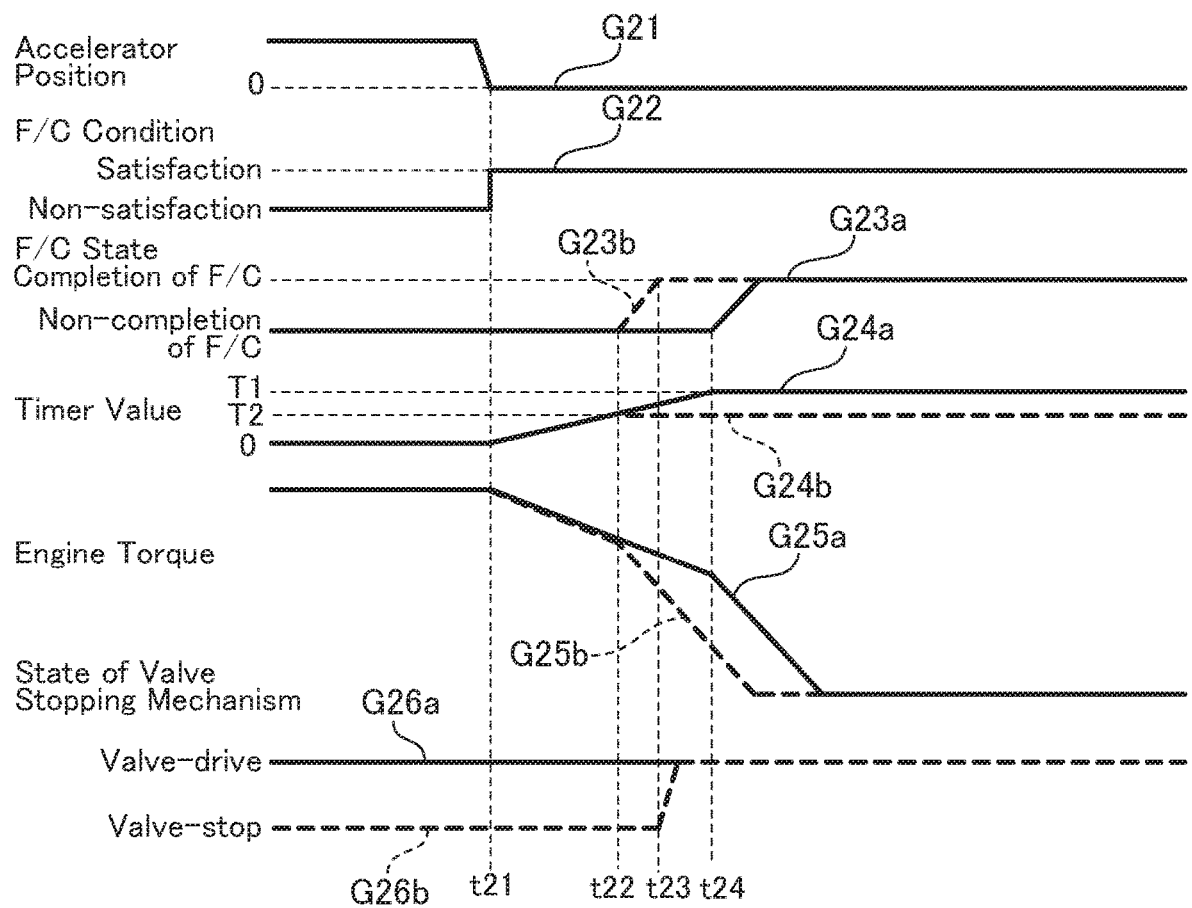
FIG. 7 is a time chart presenting operation of an engine control system employing F/C control, according to a second embodiment of the present invention.

FIG. 7 is a time chart presenting operation of the engine control system employing F/C control, according to the second embodiment. In FIG. 7, the accelerator position, the F/C condition (satisfaction or non-satisfaction), the F/C state (completion or non-completion), the timer value, the engine torque, and the state of the valve stopping mechanism 20 (valve-stop state or valve-drive state), are presented in this order in the downward direction. Further, in FIG. 7, the graphs G23a, G24a, G25a, G26a each indicated by the solid line represent changes of various states during the all-cylinder operation mode, and the graphs G23b, G24b, G25b, G26b each indicated by the broken line represent changes of the various states during the reduced-cylinder operation mode.

As depicted in FIG. 7, at time 21, the accelerator position becomes 0% (see the graph G21), and the F/C condition is satisfied (see the graph G22). At this point, the PCM 50 operates to start counting of a timer so as to obtain an elapsed time after satisfaction of the F/C condition (see the graphs G14a, G14b). Simultaneously, the PCM 50 operates to execute ignition retard control of gradually retarding the ignition timing of the spark plugs 14 (not presented in FIG. 7). As a result, before start of the F/C, the engine torque is gradually reduced (see the graphs G25a, G25b). Thus, at the start of the F/C, it is possible to establish a state in which the engine torque is reduced to some extent.

In the case where the engine 10 is operated in the all-cylinder operation mode, when the counted timer value has reached a first given time period T1, the PCM 50 operates to start the F/C at time t24 (see the graph G23a).

On the other hand, in the case where the engine 10 is operated in the reduced-cylinder operation mode, when the counted timer value has reached a second given time period T2 shorter than the first given time period T1, the PCM 50 operates to start the F/C at tine t22 (at an earlier timing than the time t24 as the F/C start timing during the all-cylinder operation mode) (see the graph G23b). Subsequently, when the F/C with respect to all the cylinders (activated cylinders) 2 has been completed, the PCM 50 operates to start at time t23 to control the valve stopping mechanism 20 such that the intake and exhaust valves 12, 17 in the deactivated cylinders 2 are switched from the valve-stop state to the valve-drive state (see the graph G26b). As a result, the engine 10 is substantially switched from the reduced-cylinder operation mode and the all-cylinder operation mode.

Figure 8:
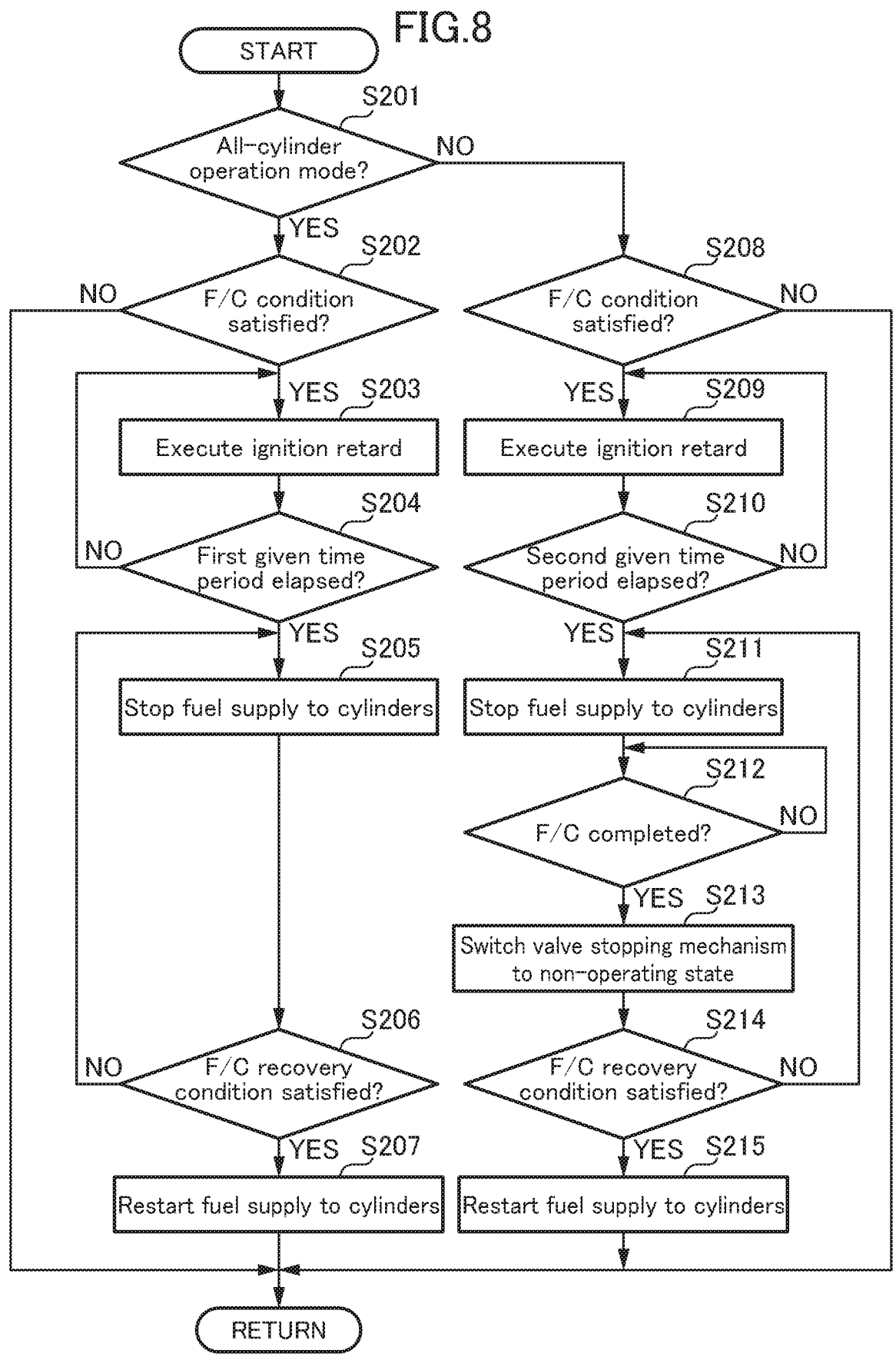
FIG. 8 is a flowchart presenting a F/C control processing routine to be executed by the engine control system according to the second embodiment.

FIG. 8 is a flowchart presenting a F/C control processing routine to be executed by the engine control system according to the second embodiment. This flow is also repeatedly executed by the PCM 50 in a given cycle period. Here, processings in steps S201, S202, S204 to S208 and S210 to S215 (processing in the remaining steps other than steps S203 and S209) in FIG. 8 are the same, respectively, as the processings in the steps S101, S102, S103 to S107 and S108 to S113 in FIG. 6. Thus, description about these processings in FIG. 8 will be omitted. The following description will be primarily made about the processings in the steps S203 and S209 in FIG. 8.

The processing in the step S203 is executed when the F/C condition has been satisfied (step S202: YES). In this step S203, the PCM 50 operates to execute ignition retard control of retarding the ignition timing of the spark plugs 14 at a predetermined given speed (retard speed). Then, in the step S204, the PCM 50 operates to determine whether or not the first given time period T1 has elapsed after satisfaction of the F/C condition, based on a counted timer value. As a result, when the first given time period T1 is determined to have elapsed (step S204: YES), the processing routine proceeds to the step S205, and, on the other hand, when the first given time period T1 is determined not to have elapsed (step S204: NO), the processing routine returns to the step S203. In the latter case where the first given time period T1 is determined not to have elapsed, the PCM 50 operates to repeatedly perform the processings in the steps S203 and S204 until the first given time period T1 elapses. In this case, the PCM 50 operates to continuously perform the ignition retard control until the first given time period T1 elapses, to thereby reduce the engine torque.

Further, the processing in the step S209 is performed in the same manner as that in the step S203. Specifically, in the step S209, the PCM 50 operates to execute the ignition retard control in the same manner as that in the step S203. Then, in the step S210, the PCM 50 operates to determine whether or not a second given time period T2 (<the first given time period T1) has elapsed after satisfaction of the F/C condition, based on a counted timer value. As a result, when the second given time period T2 is determined to have elapsed (step S210: YES), the processing routine proceeds to the step S211, and, on the other hand, when the second given time period T2 is determined not to have elapsed (step S210: NO), the processing routine returns to the step S209. In the latter case where the second given time period T2 is determined not to have elapsed, the PCM 50 operates to repeatedly perform the processings in the steps S209 and S210 until the second given time period T2 elapses. In this case, the PCM 50 operates to continuously perform the ignition retard control until the second given time period T2 elapses, to thereby reduce the engine torque.

In the engine control system according to the second embodiment, the F/C start timing can be advanced during the reduced-cylinder operation mode, as compared to during the all-cylinder operation mode, as with the first embodiment. Therefore, it becomes possible to reduce a difference in engine brake force produced during the F/C, between the reduced-cylinder operation mode and the all-cylinder operation mode, and adequately suppress a difference in deceleration feeling given to a driver during the F/C, between the reduced-cylinder operation mode and the all-cylinder operation mode. Further, in the engine control system according to the second embodiment, the ignition retard control is executed during the period after satisfaction of the F/C condition through until the start of the F/C, so that it is possible to adequately suppress a rapid change in the engine torque due to the F/C.

Third Embodiment

Thirdly, the control in the engine control system according to the third embodiment will be described. In the third embodiment, the PCM 50 is operable, during a period after satisfaction of the F/C condition through until the start of the F/C, to execute the ignition retard control of gradually retarding the ignition timing of the spark plugs 14 to thereby reduce engine torque, as with the second embodiment. However, differently from the first and second embodiments, in the second embodiment, the PCM 50 does not use the given time period after satisfaction of the F/C condition through until the start of the F/C. That is, the F/C is not started based on the elapsed time after satisfaction of the F/C condition. Instead, in the third embodiment, the PCM 50 is operable, when the ignition timing retarded after satisfaction of the F/C condition has reached a given value, typically an upper limit of a retardable range of ignition timing (retard limit), to start the F/C, and change a retard speed between the reduced-cylinder operation mode and the all-cylinder operation mode. More specifically, the PCM 50 is operable, during the reduced-cylinder operation mode, to increase the retard speed, as compared to during the all-cylinder operation mode. In this case, during the reduced-cylinder operation mode, ignition timing will reach the retard limit at an earlier timing than during the all-cylinder operation mode. As a result, the F/C start timing is advanced during the reduced-cylinder operation mode, as compared to during the all-cylinder operation mode.

In the following description, different control and processing from those in the first and second embodiments will be primarily described, and the same control and processing as those in the first and second embodiment will be appropriately omitted. That is, any control and processing which are not described below should be considered to be the same as those in the first and second embodiment. The same is applied to description about advantageous effects.

Figure 9:
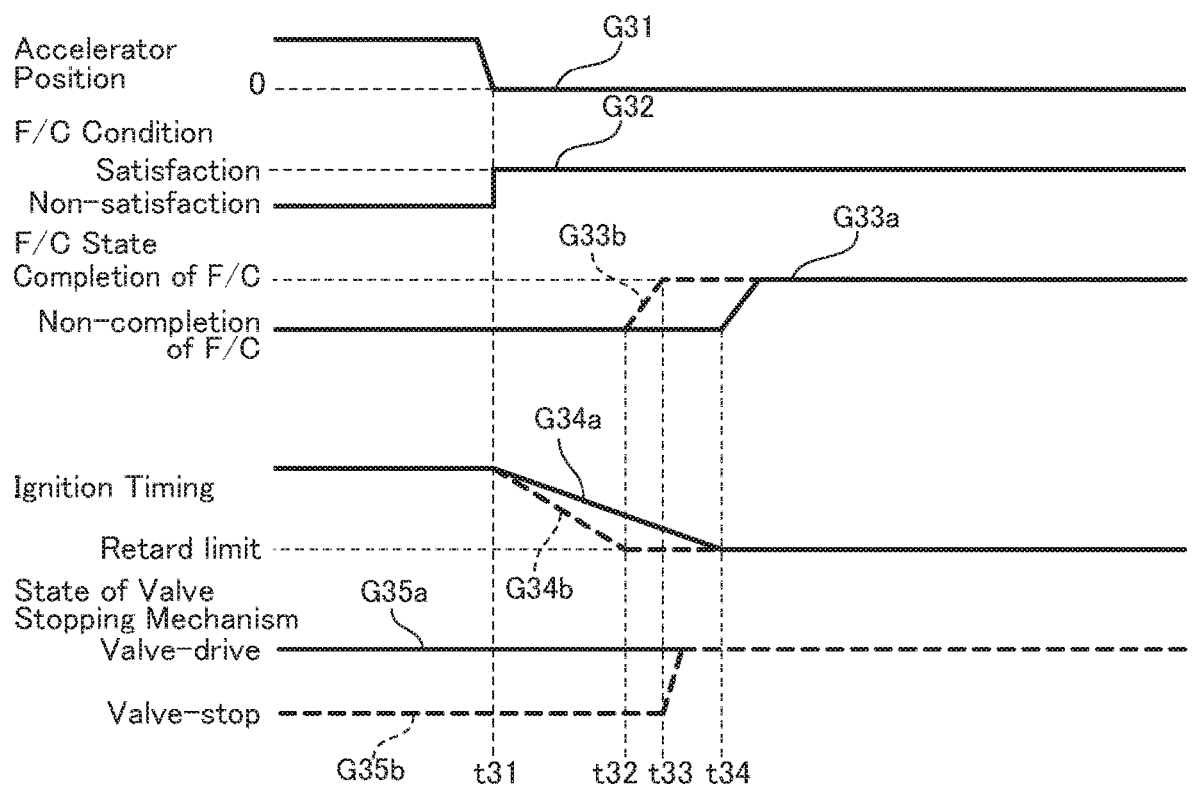
FIG. 9 is a time chart presenting operation of an engine control system employing F/C control, according to a third embodiment of the present invention.

FIG. 9 is a time chart presenting operation of the engine control system employing F/C control, according to the third embodiment. In FIG. 9, the accelerator position, the F/C condition (satisfaction or non-satisfaction), the F/C state (completion or non-completion), the ignition timing (in FIG. 9, a retard value increases in a downward direction), and the state of the valve stopping mechanism 20 (valve-stop state or valve-drive state), are presented in this order in the downward direction. Further, in FIG. 9, the graphs G33a, G34a, G35a each indicated by the solid line represent changes of various states during the all-cylinder operation mode, and the graphs G33b, G34b, G35b each indicated by the broken line represent changes of the various states during the reduced-cylinder operation mode.

As depicted in FIG. 9, at time 31, the accelerator position becomes 0% (see the graph G31), and the F/C condition is satisfied (see the graph G32). At this point, the PCM 50 operates to start the ignition retard control of gradually retarding the ignition timing of the spark plugs 14 (see the graphs G34a, G34b). Specifically, during the reduced-cylinder operation mode, the PCM 50 operates to retard ignition timing at a higher retard speed than during the all-cylinder operation mode. That is, during the reduced-cylinder operation mode, the PCM 50 operates to increase a retard amount of ignition timing (which is equivalent to an amount or rate of change in retard of ignition timing) per unit time, as compared to during the all-cylinder operation mode.

In the case where the engine 10 is operated in the all-cylinder operation mode, the retarded ignition timing reaches the retard limit at time t34 (see the graph G34a). Thus, in this case, the PCM 50 operates to start the F/C at the time t34 (see the graph G33a). On the other hand, in the case where the engine 10 is operated in the reduced-cylinder operation mode, the retarded ignition timing reaches the retard limit at time t32, (see the graph G34b). Thus, in this case, the PCM 50 operates to start the F/C at the time t32

(see the graph G33*b*). Subsequently, when the F/C with respect to all the cylinders (activated cylinders) 2 has been completed, the PCM 50 operates to start at time t33 to control the valve stopping mechanism 20 such that the intake and exhaust valves 12, 17 in the deactivated cylinders 2 are switched from the valve-stop state to the valve-drive state (see the graph G35*b*). As a result, the engine 10 is substantially switched from the reduced-cylinder operation mode and the all-cylinder operation mode.

Figure 10:
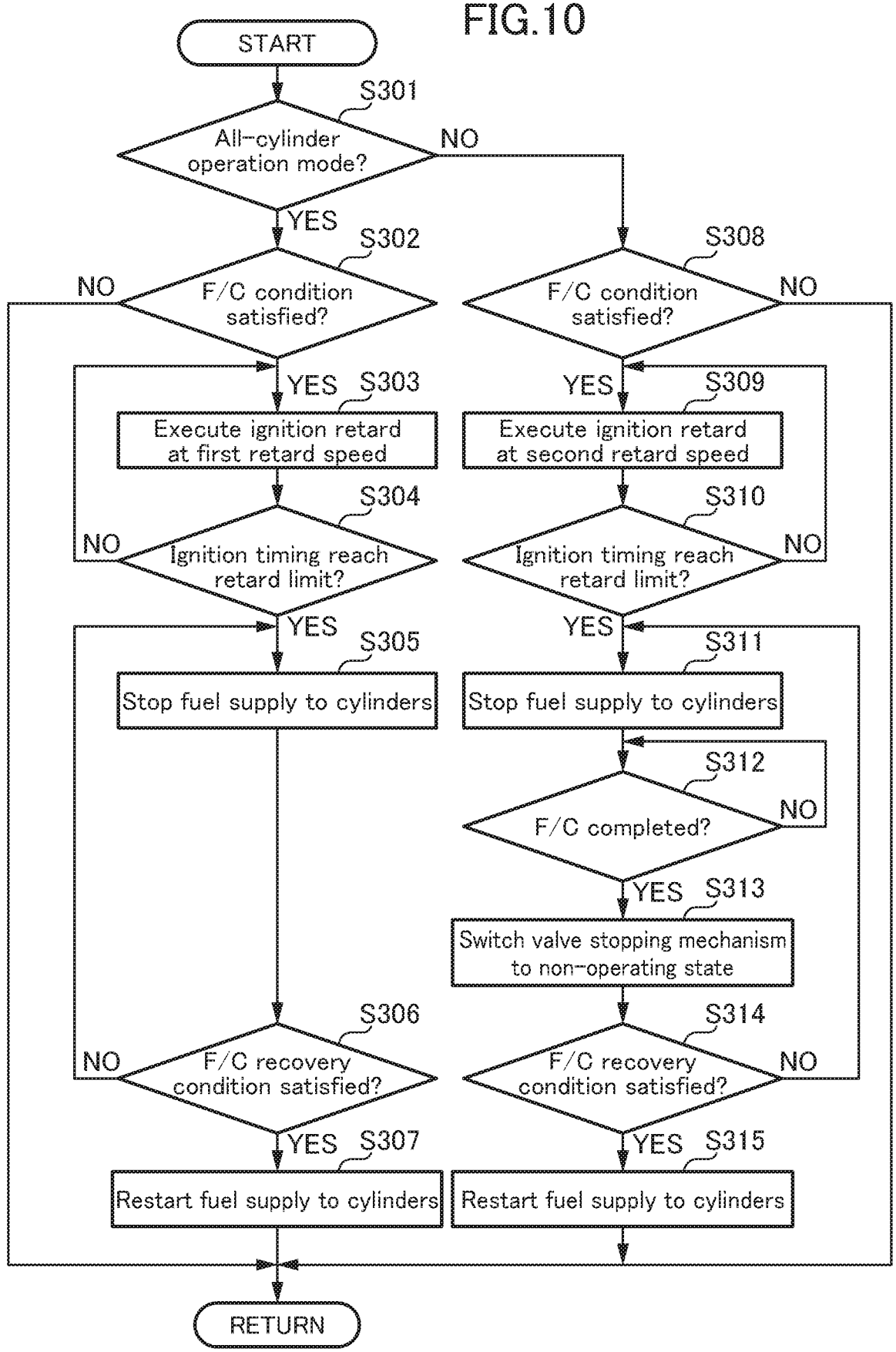
FIG. 10 is a flowchart presenting a F/C control processing routine to be executed by the engine control system according to the third embodiment.

FIG. 10 is a flowchart presenting a F/C control processing routine to be executed by the engine control system according to the third embodiment. This flow is also repeatedly executed by the PCM 50 in a given cycle period. Here, processings in steps S301, S302, S205 to S308 and S311 to S315 (processing in the remaining steps other than steps S303, S304, S309 and S310) in FIG. 10 are the same, respectively, as the processings in the steps S201, S202, S205 to S208 and S211 to S215 in FIG. 8. Thus, description about these processings in FIG. 10 will be omitted. The following description will be primarily made about the processings in the steps S303, S304, S309 and S310 in FIG. 10.

The processing in the step S303 is executed when the F/C condition has been satisfied (step S302: YES). In this step S303, the PCM 50 operates to execute the ignition retard control of retarding the ignition timing of the spark plugs 14 at a predetermined relatively-low first retard speed. Then, in the step S304, the PCM 50 operates to determine whether or not the ignition timing of the spark plugs 14 has reached the retard limit. As a result, when the ignition timing is determined to have reached the retard limit (step S304: YES), the processing routine proceeds to the step S305 in which the PCM 50 operates to execute the F/C. On the other hand, when the ignition timing is determined not to have reached the retard limit (step S304: NO), the processing routine returns to the step S303. In this case, the PCM 50 operates to repeatedly perform the processings in the steps S303 and S304 until the ignition timing reaches the retard limit. That is, the PCM 50 operates to continuously execute the ignition retard control at the first retard speed until the ignition timing reaches the retard limit.

Further, the processing in the step S309 is performed in the same manner as that in the step S303. Specifically, in the step S309, the PCM 50 operates to execute the ignition retard control of retarding the ignition timing of the spark plugs 14 at a predetermined relatively-high second retard speed (specifically, a retard speed higher than the first retard speed during the all-cylinder operation mode). Then, in the step S310, the PCM 50 operates to determine whether or not the ignition timing of the spark plugs 14 has reached the retard limit. As a result, when the ignition timing is determined to have reached the retard limit (step S310: YES), the processing routine proceeds to the step S311 in which the PCM 50 operates to execute the F/C. On the other hand, when the ignition timing is determined not to have reached the retard limit (step S310: NO), the processing routine returns to the step S309. In this case, the PCM 50 operates to repeatedly perform the processings in the steps S309 and S310 until the ignition timing reaches the retard limit. That is, the PCM 50 operates to continuously execute the ignition retard control at the second retard speed until the ignition timing reaches the retard limit.

In the engine control system according to the third embodiment, the F/C is started when the ignition timing retarded after satisfaction of the F/C condition has reached the retard limit, wherein the retard speed is increased during the reduced-cylinder operation mode, as compared to during the all-cylinder operation mode. In this case, the F/C start timing can also be advanced during the reduced-cylinder operation mode, as compared to during the all-cylinder operation mode, as with the first and second embodiments. Therefore, it becomes possible to reduce a difference in engine brake force produced during the F/C, between the reduced-cylinder operation mode and the all-cylinder operation mode, and adequately suppress a difference in deceleration feeling given to a driver during the F/C, between the reduced-cylinder operation mode and the all-cylinder operation mode. Further, in the engine control system according to the third embodiment, the ignition retard control is executed during the period after satisfaction of the F/C condition through until the start of the F/C, as with the second embodiment, so that it is possible to adequately suppress a rapid change in the engine torque due to the F/C.

<Modifications>

Next, modifications of the above embodiments will be described. The following modifications may be implemented in the form of a combination of two or more of them. Further, these modifications may be implemented in combination with any of the first to third embodiments.

In the first embodiment, the region where the engine torque is around 0, as depicted in FIG. 4 (which is equivalent to the region where the engine load is approximately 0, i.e., the accelerator position is approximately 0%) is set as the all-cylinder operation range, instead of the reduced-cylinder operation range. Alternatively, the region where the engine torque is around 0 may be set as the reduced-cylinder operation range. That is, the reduced-cylinder operation range may be set such that it extends to the region where the engine torque is around 0. In this case, when the engine 10 is transitioned from the reduced-cylinder operation mode execution state to the state of operation under satisfaction of the F/C condition, the reduced-cylinder operation mode will be maintained. However, when the F/C has been completed during the reduced-cylinder operation mode, the intake and exhaust valves 12, 17 in the deactivated cylinders 2 are switched from the valve-stop state to the valve-drive state, i.e., set in a state substantially equal to the all-cylinder operation mode.

In the above embodiments (typically, the first and second embodiments), the time period after satisfaction of the F/C condition through until the start of the F/C is increased during the reduced-cylinder operation mode, as compared to during the all-cylinder operation mode. Alternatively, the time period after satisfaction of the F/C condition through until the start of the F/C may be set according to the negative pressure inside the intake passage 1 of the engine 19. For example, the time period after satisfaction of the F/C condition through until the start of the F/C is preferably set such that it becomes shorter as the negative pressure corresponding to the intake pressure detected by the intake pressure sensor 33 becomes smaller. As a result of this setting, during the reduced-cylinder operation mode, the time period after satisfaction of the F/C condition through until the start of the F/C becomes shorter than that during the all-cylinder operation mode (because the negative pressure inside the intake passage 1 becomes smaller during the reduced-cylinder operation mode). Thus, it becomes possible to advance the F/C start timing during the reduced-cylinder operation mode.

Alternatively, the time period after satisfaction of the F/C condition through until the start of the F/C may be set according to the engine speed of the engine 10. For example, the time period after satisfaction of the F/C condition through until the start of the F/C is preferably set such that it becomes shorter as the engine speed corresponding to the crank angle detected by the crank angle sensor 34 becomes lower. As a result of this setting, during the reduced-cylinder operation mode, the time period after satisfaction of the F/C condition through until the start of the F/C becomes shorter than that during the all-cylinder operation mode (because the engine speed becomes lower during the reduced-cylinder operation mode). Thus, it becomes possible to advance the F/C start timing during the reduced-cylinder operation mode.

In the third embodiment, the F/C is started when the ignition timing retarded after satisfaction of the F/C condition has reached the retard limit. However, the ignition retard control in the present invention is not limited to retarding the ignition timing to the retard limit before starting the F/C, as in the third embodiment. For example, an ignition timing on an advance side with respect to the retard limit may be used as a given value, and the F/C may be started when the ignition timing retarded after satisfaction of the F/C condition has reached this given value.

In the third embodiment, during the period after satisfaction of the F/C condition through until the start of the F/C, the ignition timing is retarded to reduce the engine torque. However, means to reduce the engine torque in the present invention is not limited to retarding the ignition timing, but the engine torque may be reduced by any of various other techniques. For example, the engine torque may be reduced by gradually reducing the fuel injection amount during the period after satisfaction of the F/C condition through until the start of the F/C. In the case where the engine torque is reduced by any of such various other techniques, the F/C may be started when a reduction amount of the engine torque has reached a given value, and control of increasing the reduction amount of the engine torque during the reduced-cylinder operation mode, as compared to during the all-cylinder operation mode, and/or control of increasing a reduction rate of the engine torque, as compared to during the reduced-cylinder operation mode, as compared to during the all-cylinder operation mode, may be performed. This makes it possible to advance the F/C start timing during the reduced-cylinder operation mode, as compared to during the all-cylinder operation mode, while adequately reducing the engine torque during the F/C.

LIST OF REFERENCE SIGNS 1 intake passage
2 cylinder
5 throttle valve
10 engine
13 fuel injector
14 spark plug
18 intake variable valve timing mechanism
19 exhaust variable valve timing mechanism
20 valve stopping mechanism
30 accelerator position sensor
50 PCM
100 engine system

The invention claimed is:

1. An engine control system comprising:
an engine having a plurality of cylinders and capable of being operated while switching between a reduced-cylinder operation mode in which combustion is stopped in a part of the plurality of cylinders and an all-cylinder operation mode in which combustion is performed in all the plurality of cylinders; and
a controller configured to stop fuel supply to the cylinders when a given fuel cut-off condition has been satisfied,
wherein the controller is operable, during a transition from a state in which the engine is operated in the reduced-cylinder operation mode to a state in which the fuel cut-off condition is satisfied, to stop the fuel supply to the cylinders at a timing earlier than that during a transition from a state in which the engine is operated in the all-cylinder operation mode to the state in which the fuel cut-off condition is satisfied.

2. The engine control system according to claim 1,
wherein the controller is further configured to perform a control of reducing a torque of the engine when the fuel cut-off condition has been satisfied, and to determine whether or not a reduction amount of the torque caused by the control of reducing the torque has reached a given value,
wherein the controller is operable to stop the fuel supply to the cylinders when the reduction amount of the torque is determined to reach the given value, and
wherein the controller is operable, during the transition from the state in which the engine is operated in the reduced-cylinder operation mode to the state in which the fuel cut-off condition is satisfied, to perform at least one of a control of increasing the reduction amount of the torque and a control of increasing a reduction rate of the torque, as compared to during the transition from the state in which the engine is operated in the all-cylinder operation mode to the state in which the fuel cut-off condition is satisfied.

3. The engine control system according to claim 1,
wherein the controller is operable to stop the fuel supply to the cylinders when a given time period has elapsed after a satisfaction of the fuel cut-off condition, and
wherein the controller is operable, during the transition from the state in which the engine is operated in the reduced-cylinder operation mode to the state in which the fuel cut-off condition is satisfied, to shorten the given time period, as compared to during the transition from the state in which the engine is operated in the all-cylinder operation mode to the state in which the fuel cut-off condition is satisfied.

4. The engine control system according to claim 1, which further comprises a valve stopping mechanism provided in the engine and capable of switching between a valve-closed state maintaining mode in which at least one of a group of intake valves and a group of exhaust valves of the engine is partially maintained in a valve-closed state and an opening-closing mode in which the valve-closed state maintaining mode is released to set all the intake and exhaust valves to an openable-closable state,
wherein the controller is further configured to set the valve stopping mechanism to the valve-closed state maintaining mode, in the reduced-cylinder operation mode, and
wherein the controller is operable to the opening-closing mode when the stop of the fuel supply has been completed, to switch the valve stopping mechanism which is set in the valve-closed state maintaining mode.

5. The engine control system according to claim 1, wherein the controller is operable to stop the fuel supply to the cylinders when a time period according to a negative pressure inside an intake passage of the engine has elapsed after a satisfaction of the fuel cut-off condition.

6. The engine control system according to claim 1, wherein the controller is operable to stop the fuel supply to the cylinders when a given time period according to an engine speed of the engine has elapsed after a satisfaction of the fuel cut-off condition.

7. The engine control system according to claim 2, which further comprises a valve stopping mechanism provided in the engine and capable of switching between a valve-closed state maintaining mode in which at least one of a group of intake valves and a group of exhaust valves of the engine is partially maintained in a valve-closed state and an opening-closing mode in which the valve-closed state maintaining mode is released to set all the intake and exhaust valves to an openable-closable state,
  wherein the controller is further configured to set the valve stopping mechanism to the valve-closed state maintaining mode, in the reduced-cylinder operation mode, and
  wherein the controller is operable to the opening-closing mode when the stop of the fuel supply has been completed, to switch the valve stopping mechanism which is set in the valve-closed state maintaining mode.

8. The engine control system according to claim 3, which further comprises a valve stopping mechanism provided in the engine and capable of switching between a valve-closed state maintaining mode in which at least one of a group of intake valves and a group of exhaust valves of the engine is partially maintained in a valve-closed state and an opening-closing mode in which the valve-closed state maintaining mode is released to set all the intake and exhaust valves to an openable-closable state,
  wherein the controller is further configured to set the valve stopping mechanism to the valve-closed state maintaining mode, in the reduced-cylinder operation mode, and
  wherein the controller is operable to the opening-closing mode when the stop of the fuel supply has been completed, to switch the valve stopping mechanism which is set in the valve-closed state maintaining mode.

9. The engine control system according to claim 2, wherein the controller is operable to stop the fuel supply to the cylinders when a time period according to a negative pressure inside an intake passage of the engine has elapsed after a satisfaction of the fuel cut-off condition.

10. The engine control system according to claim 3, wherein the controller is operable to stop the fuel supply to the cylinders when a time period according to a negative pressure inside an intake passage of the engine has elapsed after a satisfaction of the fuel cut-off condition.

11. The engine control system according to claim 4, wherein the controller is operable to stop the fuel supply to the cylinders when a time period according to a negative pressure inside an intake passage of the engine has elapsed after a satisfaction of the fuel cut-off condition.

12. The engine control system according to claim 2, wherein the controller is operable to stop the fuel supply to the cylinders when a given time period according to an engine speed of the engine has elapsed after a satisfaction of the fuel cut-off condition.

13. The engine control system according to claim 3, wherein the controller is operable to stop the fuel supply to the cylinders when a given time period according to an engine speed of the engine has elapsed after a satisfaction of the fuel cut-off condition.

14. The engine control system according to claim 4, wherein the controller is operable to stop the fuel supply to the cylinders when a given time period according to an engine speed of the engine has elapsed after a satisfaction of the fuel cut-off condition.

15. The engine control system according to claim 5, wherein the controller is operable to stop the fuel supply to the cylinders when a given time period according to an engine speed of the engine has elapsed after a satisfaction of the fuel cut-off condition.

\* \* \* \* \*